(12) United States Patent
Þorbjörnsson

(10) Patent No.: US 11,041,343 B2
(45) Date of Patent: Jun. 22, 2021

(54) CONNECTORS FOR HIGH TEMPERATURE GEOTHERMAL WELLS

(71) Applicant: ÍSLENSKAR ORKURANNSÓKNIR-ÍSOR, Reykjavik (IS)

(72) Inventor: Ingólfur Þorbjörnsson, Garðabær (IS)

(73) Assignee: ÍSLENSKAR ORKURANNSÓKNIR—ÍSOR, Reykjavik (IS)

( * ) Notice: Subject to any disclaimer, the term of this patent is extended or adjusted under 35 U.S.C. 154(b) by 461 days.

(21) Appl. No.: 16/063,355

(22) PCT Filed: Dec. 19, 2016

(86) PCT No.: PCT/IS2016/050020
§ 371 (c)(1),
(2) Date: Jun. 18, 2018

(87) PCT Pub. No.: WO2017/103950
PCT Pub. Date: Jun. 22, 2017

(65) Prior Publication Data
US 2018/0363389 A1 Dec. 20, 2018

(30) Foreign Application Priority Data
Dec. 18, 2015 (IS) .......................... 050129

(51) Int. Cl.
*F16L 27/12* (2006.01)
*E21B 17/07* (2006.01)
(Continued)

(52) U.S. Cl.
CPC .......... *E21B 17/07* (2013.01); *E21B 17/0423* (2013.01); *E21B 17/08* (2013.01); *F16L 15/00* (2013.01)

(58) Field of Classification Search
CPC ... F16L 27/08; F16L 27/0808; F16L 27/0804; F16L 27/12; F16L 27/125; E21B 17/07
(Continued)

(56) References Cited

U.S. PATENT DOCUMENTS 3,433,506 A * 3/1969 Crowe .................... E21B 36/00
285/187
5,085,273 A 2/1992 Coone
(Continued)

FOREIGN PATENT DOCUMENTS

CN 102191919 A 9/2011
EP 0231076 A1 8/1987
(Continued)

OTHER PUBLICATIONS

International Search Report and Written Opinion dated Apr. 13, 2017 for corresponding International Application No. PCT/IS2016/050020.
(Continued)

*Primary Examiner* — Aaron M Dunwoody
(74) *Attorney, Agent, or Firm* — Tarolli, Sundheim, Covell & Tummino LLP

(57) ABSTRACT

Connectors may be used for connecting case settings in high temperature wells, such as geothermal or oil wells. The connector is simple in design and is able to take up thermal expansion due to temperature change when high temperature media starts to flow through the casings and when the well needs to be cooled down for maintenance.

16 Claims, 7 Drawing Sheets

(51) Int. Cl.
  *E21B 17/08* (2006.01)
  *E21B 17/042* (2006.01)
  *F16L 15/00* (2006.01)
(58) Field of Classification Search
  USPC .................................................. 285/302, 187
  See application file for complete search history.

(56) References Cited

U.S. PATENT DOCUMENTS

2010/0163250 A1   7/2010  Schultz
2015/0167401 A1   6/2015  Loviknes

FOREIGN PATENT DOCUMENTS

GB      2324579 A     10/1998
WO    2014/016758 A2    1/2014

OTHER PUBLICATIONS

Iceland Search Report dated Apr. 29, 2016 for corresponding Patent Application No. SE 2016 00148.

* cited by examiner

CONNECTORS FOR HIGH TEMPERATURE GEOTHERMAL WELLS

RELATED APPLICATIONS

The present application is a U.S. National Stage application under 35 USC 371 of PCT Application Serial No. PCT/IS2016/050020, filed on 19 Dec. 2016; which claims priority from IS Patent Application No. 050129, filed 18 Dec. 2015, the entirety of both of which are incorporated herein by reference.

FIELD

The invention relates to connectors for casings used in high temperature wells. More specifically the present invention provides connectors and methods for connecting casing segments of wells for temperatures higher than 100° C. such as geothermal or oil wells.

INTRODUCTION

From the beginning of harvesting geothermal energy, borehole linings and the quality of materials used in linings and connectors for linings has mostly been carbon steels, same as for the oil industry. The technology and components used for geothermal boreholes has been adapted more or less from the oil and gas industry following the standards of that industry. There is a lot of difference between harvesting geothermal energy on one hand and oil and gas on the other hand, specifically when it comes to the temperature variations in the linings during start up, shutdown or harvesting.

In general, oil and geothermal wells are designed using several casing strings, often starting with a surface casing (conductor), and then often pressure barrier casing (anchor casing) and then a production casing (FIG. 1). Thereafter the conductor (perforated liner) is then from production casing often to the bottom of the well, sometimes the perforated liner is not used. Concrete is used between casing (lining) to prevent flow of fluid from the strata as well as to ensure that the linings sit tight. After drilling, the borehole is activated which may increase the temperature of the well to over 200° C. for conventional geothermal boreholes and over 350° C. for ultra-hot boreholes and deep drilling. A connector is used to connect the casing segments, where the casing segments are connected before they are lowered into the borehole. The connector ensures a continuous casing along the length of the well segment before drilling the next. A conventional connector between two casing pipes work such that two pipes are screwed together and rigidly secured into the connector.

The temperature change between cement job and after activation of the well can range from 300° C. to above 400° C. A production liner may be in the range of 800-1200 meters in length and in the case of deep drilling it may be up to 3-4000 meters. The steel used for the casing is subjected to expansion with increased temperature, where an elongation of around 1.2 mm/m is calculated for each 100° C. increase in temperature, dependent on the material used. For segment of casing in the production liner of 12 meters in length, this corresponds to 14.4 mm increase in length for a temperature increase of 100° C. Due to the cementing which prevent the liner to move axially, the production liner needs to take up this increase as an increase in compression stain, which is often well above the yield stress of the steel in the casing. This means a considerable pressure on connectors, which are fixed in concrete in the well. For example, a 1000-meter long production liner in a temperature difference of 250° C. from cementing to production, the increase in length of 3 meters is expected if the casing had freedom to expand axially. When such a borehole has reached operating temperature and the connectors and liners have floated and elongated due to the overload, a balance is established for transfers and load. If it is necessary to cool the borehole again, as often as needed to maintain, the liner has inherently been shortened due to over yield load during heating and working temperature, and then casing segments may as a result, tear out of the connector or break or tear apart themselves. This may render the well useless afterwards, but the expense in drilling one hole is enormous.

EP 1754920 discloses a coupling for oil well pipe with a screw joint for connecting the pipes. The coupling comprises a male screw tube equipped with a seal forming portion having a convex curved surface shape on a tip end portion of the tube and a female screw tube equipped with a tapered seal portion. This coupling connects two pipes but does not take up any expansion or contraction as a result of temperature change.

EP 0231076 is a connector which can handle different temperatures and comprises a ferrule or a sealing member, which is not attached to the joining pipes. The sealing member allows for some expansion or contraction of the pipes in combination with another sealing member without a leak to occur due to a different thermal expansion coefficient of a sealing ferrule on one hand and the connector on the other hand. The sealing ferrule is however not attached to one of the pipes being connected and does therefore not take active part in expansion or contraction of the pipes being connected, but is secured by at least two screws preventing an axial movement of the sealing ferrule. Such a connector is also not designed to fit into a well drilled for oil or geothermal media recovery due to its large outer diameter.

SUMMARY

The present invention provides a connector for joining casing segments in making a casing when in oil wells or wells for harvesting geothermal media. The connector is simple in design and is able to take up thermal expansion due to temperature change when high temperature media starts to flow through the casings and contraction when the well needs to be cooled down for maintenance. The first casing is attached to the connector by a screw thread but the second casing is attached to an inner slidable member by a screw thread, where the inner slidable member forms a metallic seal with an outer member and where the slidable inner member is able to slide up and down in the first portion of the connector to respond to expansion or contraction of the casing segments due to temperature changes. This will allow the casing to take up thermal expansion due to temperature change when high temperature media starts to flow through the casings. This will also solve the problem of casing segments being torn out of connectors or being torn apart due to thermal contraction when a well is cooled down or stopped for maintenance or other purposes.

It is an object of the present invention to overcome and/or ameliorate the aforementioned drawbacks of the prior art and to provide an improved and/or alternative and/or additional device or method for connecting casings used in drilling geothermal or oil wells and transport of geothermal media or oil using a new connector of the present invention. It is one preferred object of the present invention to provide a connector for connecting casings in geothermal or oil wells where the connectors take up both expansion and contraction of the casings as a result of temperature change, when the wells heat up and cool down again. Moreover, it is a preferred object of the present invention to provide a method for connecting casings used in drilling geothermal or oil wells and transport of geothermal media or oil using a connector of the present invention, wherein one of the casing is connected to a slidable member within the casing to take up the increase in the length of the casing when the well is activated transporting media of high temperatures and then a decrease in length when the well is cooled down again.

The object(s) underlying the present invention is (are) particularly solved by the features defined in the independent claims. The dependent claims relate to preferred embodiments of the present invention. Further additional and/or alternative aspects are discussed below.

The present invention provides a connector for connecting casing segments used in wells drilled in high temperature areas and for transport of high temperature media. The connector has a hollow tubular main body with a first tubular sleeve opening to be attached to first casing and a second tubular sleeve opening to be attached to a second casing. The connector has an inwardly facing circumferential spacing extending axially between an inwardly extending upper rim in proximity to the first tubular sleeve opening and an inwardly extending central rim. The connector also has an inner tubular member extending radially within the spacing, said inner tubular member comprising a first circumferential engaging zone for engaging a mating engaging zone of an end of said first casing. The connector further comprises a second circumferential engaging zone in proximity to the second tubular sleeve opening for engaging a mating engaging zone of an end of the second casing. The inner tubular member is shorter in the axial direction than the inwardly facing circumferential spacing and is reversibly slidable within the inwardly facing circumferential spacing between the inwardly extending upper rim and the inwardly extending central rim.

The invention further provides a method for connecting casing segments used in wells through high temperature areas and transport of high temperature media through the casings using the connector of the present invention, said method comprises the steps of securing a first casing to a first tubular sleeve opening of a connector having a hollow tubular main body and securing a second casing to a second tubular sleeve opening of the connector. The first casing is secured to circumferential attaching zone in the inner member of the first tubular sleeve opening and the second casing is secured to circumferential attaching zone in the second tubular sleeve opening. The inner tubular member is shorter in the axial direction than the inwardly facing circumferential spacing and is reversibly slidable within the inwardly facing circumferential spacing between the inwardly extending upper rim and the inwardly extending central rim to take up expansion and contraction of the casings as a result of a temperature change.

The connector of the present invention is suitable for connecting casing segments used for casing wells in high temperature areas and transport of high temperature media through the casings without failure in the casing line. The connector comprises a hollow tubular main body with a first tubular sleeve opening to be attached to first casing and a second tubular sleeve opening to be attached to a second casing. The first tubular sleeve opening further comprises an outer support member having an inwardly extending upper rim, and an inner member, said inner member comprising circumferential attaching zone for attaching the first casing end to the inner member of the first tubular sleeve opening and an inwardly extending lower rim. The second tubular sleeve opening has an outer support member further comprising a circumferential attaching zone for attaching the second casing end to the connector and an inwardly extending upper rim. The inner member of the first tubular sleeve opening is shorter than the outer support member and is reversibly or repetitiously slidable in the direction of the casings within the outer support member 6, between the inwardly extending upper and lower rim as the casings heat up or cool down from its initial stage.

for connecting casing segments used for casing wells in high temperature areas and transport of high temperature media through the casings without failure in the casing line. The connector comprises a hollow tubular main body with a first tubular sleeve opening to be attached to first casing and a second tubular sleeve opening to be attached to a second casing. The first tubular sleeve opening further comprises an outer support member having an inwardly extending upper rim, and an inner member, said inner member comprising circumferential attaching zone for attaching the first casing end to the inner member of the first tubular sleeve opening and an inwardly extending lower rim. The second tubular sleeve opening has an outer support member further comprising a circumferential attaching zone for attaching the second casing end to the connector and an inwardly extending upper rim. The inner member of the first tubular sleeve opening is shorter than the outer support member and is reversibly or repetitiously slidable in the direction of the casings within the outer support member 6, between the inwardly extending upper and lower rim as the casings heat up or cool down from its initial stage.

In an embodiment of the present invention the connector further comprises a first sacrificial seal or gasket between the second tubular sleeve opening and the inner member, In an embodiment of the present invention the connector further comprises a recess in the inwardly extending upper rim of the outer support member having at the distal end of the first tubular sleeve opening, where the recess comprises a second seal/gasket for preventing water, drill mud or concrete will flow into a joint between the first and second casing during mounting.

In an embodiment of the present invention the outer surface of the inner tubular member and an inwardly facing surface of the inwardly facing circumferential spacing are essentially parallel to the axial direction. The essentially parallel surfaces therefore contact to form a metallic sealing.

In an embodiment of the present invention the inner tubular member comprises an abutting inwardly extending rim that contacts the peripheral end surface of the first casing 4 when the first casing is fully attached.

In an embodiment of the present invention the longitudinal thickness of the first seal/gasket is similar to the space or the distance between the connecting portion of the inner member of first tubular sleeve opening and the connecting portion of the second tubular sleeve opening, when the inner member of the first tubular sleeve opening sits in mounting seat.

In an embodiment of the present invention the axial width of the first gasket is similar to the space between the inner tubular member and the central rim, when the inner tubular member sits in its most distal position.

In an embodiment of the present invention the high temperature media comprises one or more of oil, steam, water or brine.

In an embodiment of the present invention the circumferential sealing zone or means of the connector is a screw thread. The corresponding casings to be connected by the connector have a matching screw thread to connect the two.

In an embodiment of the present invention the circumferential engaging zone extends essentially to the abutting inwardly extending rim of the inner tubular member and wherein the circumferential engaging zone of the second tubular sleeve opening extends to the inwardly extending central rim of the second tubular sleeve opening.

In an embodiment of the present invention the longitudinal thickness of the first seal/gasket is similar to the distance between the connecting portion of the inner member of first tubular sleeve opening and the connecting portion of the second tubular sleeve opening, when the inner member of the first tubular sleeve opening sits in mounting seat and wherein the first seal/gasket melts away due to heating of the casing and the connecting portion of the inner member of first tubular sleeve opening is positioned in connecting seat.

In an embodiment of the present invention the casings are connected by screwing them into the connector before they are lowered down into a borehole using screw thread in the outer circumference of the casing and in the inner circumference of the connector.

In an embodiment of the present invention the outer support members of first and second tubular sleeve openings are formed as a as two objects and then attached together by welding, pins or other means to lock it's movement, in order to fit the slidable inner member into the construction.

In an embodiment of the present invention the outer surface of the inner member and the inner surface of outer support member have restrictive structural formations to restrict rotation around the length of the casing. The structural formations to restrict rotation around the length of the casing comprise structural formations such as, but not limited to protrusions in one member and respective depressions in the other member or slight elliptical circumference in the mating surfaces of the two members.

In an embodiment of the present invention the outer surface of the inner member and the inner surface of outer support member form a metallic seal in an open mounting position.

In an embodiment of the present invention the outer surface of the inner member and the inner surface of outer support member together with the bottom surface of the inwardly extending lower rim of the inner member and the top surface of the inwardly extending lower rim of the outer support member of the second tubular sleeve opening form a metallic seal in a connecting position.

In the present context the term "high temperature media" refers to geothermal media or oil. The device and method of the present invention is designed to work in wells in high temperature areas of 100° C. or more, where the temperature change in the casings between drilling and pumping up media differs more than 50° c., such as 100° C., 150° C., 200° C., 250° C., 300° C., or even 450° C.

In the present context the terms "inner member" and "inner tubular member" refer to the inner tubular member extending radially within the spacing axially extending between the inwardly extending upper rim in proximity to the first tubular sleeve opening and the inwardly extending central rim.

In the present context the terms "inwardly extending central rim" of the second tubular sleeve opening and "inwardly extending upper rim" of the second tubular sleeve opening refer to the same object.

In the present context the term "is movable in the axial direction of the casings" refers to the inner member of the first tubular sleeve opening, which is shorter than the outer support member 7 and is slidably or reversibly movable in the axial direction of the casings within the outer support member. This means that after mounting and after the sacrificial seal/gasket has melted away, the upper casing can move back and forth in the connector in the direction of the casing as a result of expansion and contraction of the casings as a result of temperature change. This temperature difference can be between 300-450° C. or low as 150.

In the present context the term "metallic seal" refers to a condition where two metallic surfaces are so closely arranged that they form a seal between them. This seal prevents the casings joined by the seal to leak geothermal media as well as prevent dirt and other debris to get into the casing.

In the present context the term "essentially parallel to the axial direction" refers to the outer surface of the inner tubular member and an inwardly facing surface of the inwardly facing circumferential spacing where the surfaces are perfectly axial in 0 or 180° in the axial direction of the casing. Therefore when the inner tubular member is sliding back and forth within the inwardly facing circumferential spacing of the of the upper tubular sleeve opening a metallic seal is formed along the vertical movement of the 0 or 180° surfaces within the connector.

In the present context the terms "attaching", "joining", "engaging", and "connecting" define the attachment of two casings by the connector of the present invention. In some embodiments the casings are screwed into each end of the connector and thereby the casings are connected or attached together.

In the present context the terms "mounting position", "cold position", "open position" and "maintenance position" refer to a position where the connector is connecting two casings and where the upper end of the slidable inner member is up against the upper inwardly extending rim of the outer support member forming a gap between the inwardly extending lower rim of the inner sliding member of the first tubular sleeve opening and the inwardly extending upper rim of the outer support member of the second tubular sleeve opening. During mounting a first sacrificial seal/gasket fills this gap, but this gasket melts away due to heating of the casing when high temperature geothermal media flows through casing. In this position the casings are at a colder temperature, such as during mounting or when the well is being cooled down for maintenance. In these position a metallic seal is formed by the outer surface of the inner member and the inner surface of outer support member of the first tubular sleeve opening.

In the present context the terms "operating position", "closed position", "connecting position" and "hot position" refer to a position where the connector is connecting two casings and where the inwardly extending lower rim of the slidable inner member is up against the inwardly extending upper rim of the outer support member of the second tubular sleeve opening closing a gap between the inwardly extending lower rim of the inner sliding member of the first tubular sleeve opening and the inwardly extending upper rim of the outer support member of the second tubular sleeve opening. Here the first sacrificial seal/gasket has melted away. In this position the casings are at a very high temperature, such as during pumping of geothermal media through the casing. In these position a metallic seal is formed by the outer surface of the inner slidable member and the inner surface of outer support member of the first tubular sleeve opening together with the bottom surface of the inner slidable member and the top surface inwardly extending upper rim of the outer support member of the second tubular sleeve opening.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention, without limiting its scope.

It should be appreciated that the invention is applicable for connecting casing segments in general in borehole for utilizing high temperature media, such as oil and geothermal media. Further, the connector, a system and the method according to the invention is illustrated in the embodiments that follow with a preferred embodiment of geothermal borehole, but it should be appreciated that the invention is also applicable to drilling for other purposes such as oil wells.

For the drawings below the embodiments show a connector where the sliding inner member is attached to the upper casing during drilling and assembly. The skilled person will appreciate that the connector can be used such that the sliding inner member is attached to the lower casing during drilling and assembly.

Figure 1:
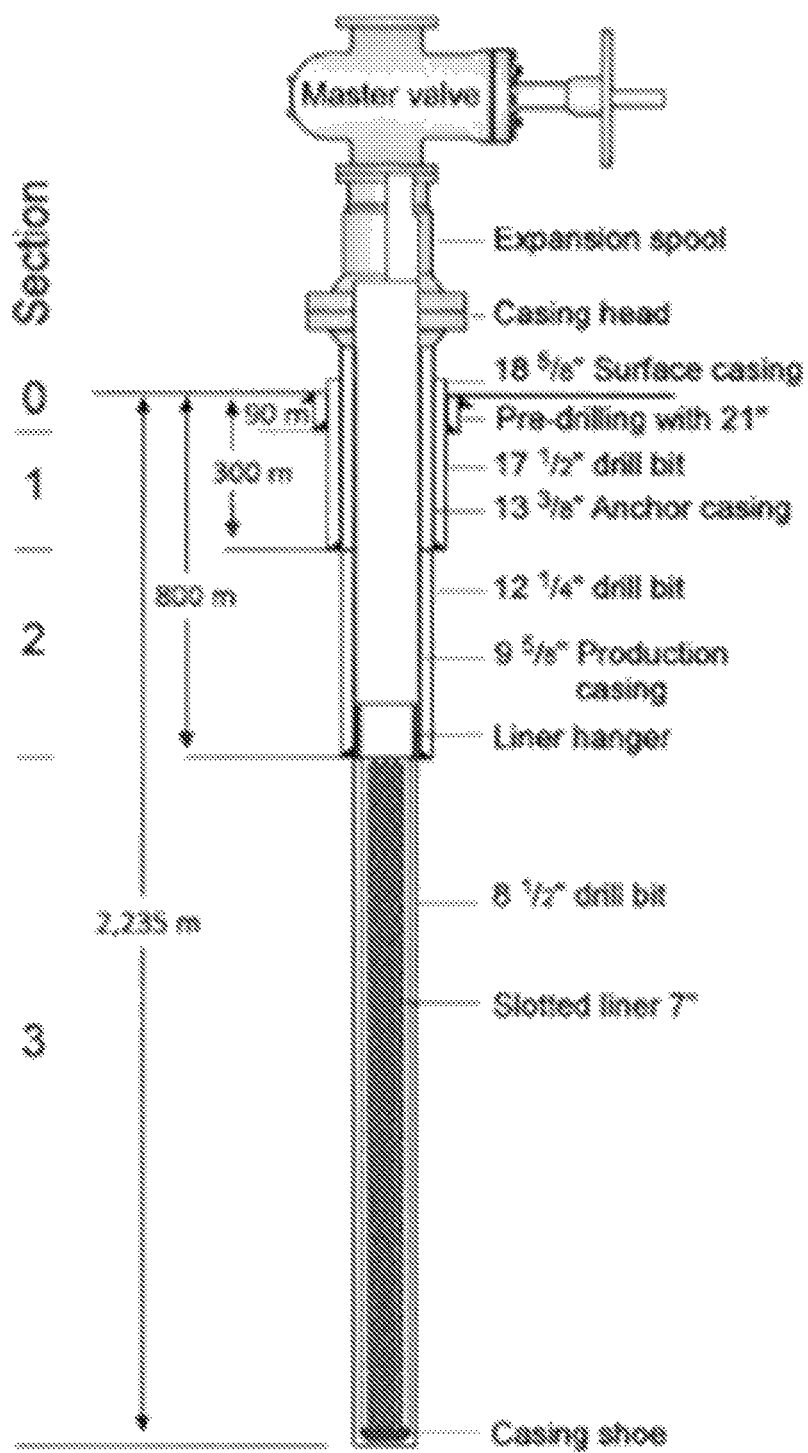
FIG. 1 shows a schematic layout of a vertical well with regular diameter used in geothermal drilling.
Figure 2A:
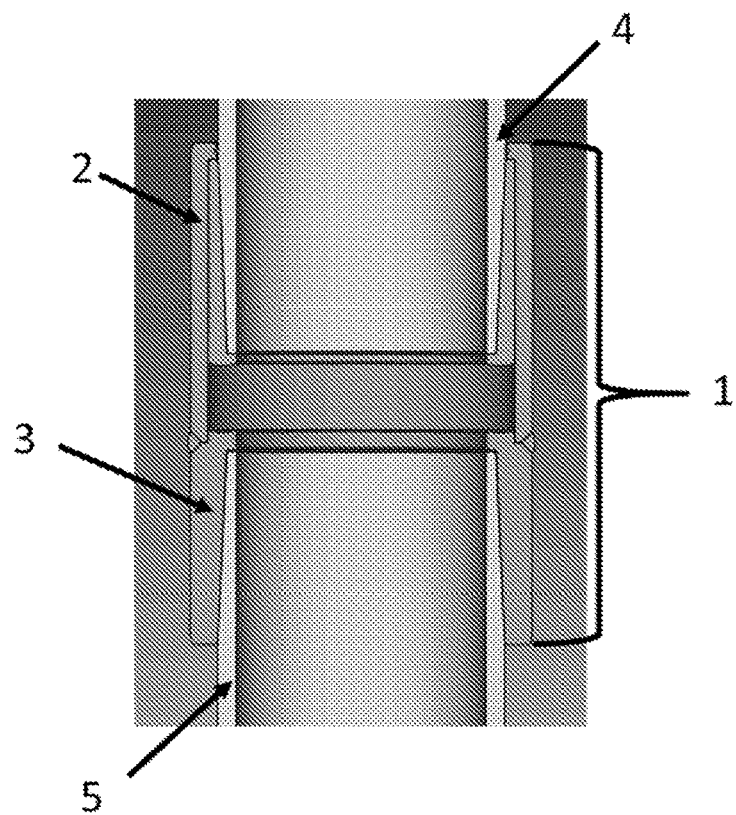
FIG. 2 shows the connector of the present invention in mounting position.

Referring to FIG. 2A, there is schematically shown connector for connecting two casings. The drawing is a transactional view of a connector having a hollow tubular main body 1 with an upper tubular sleeve opening 2 and a lower tubular sleeve opening 3 to be attached to an upper casing 4 and a lower casing 5.

Figure 2B:
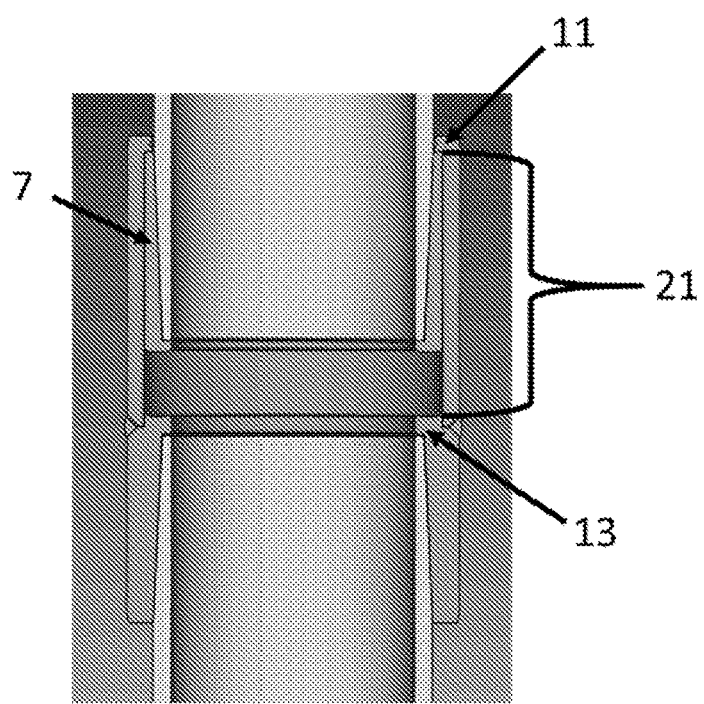

In FIG. 2B the connector for connecting casing segments is shown with a similar drawing as in FIG. 2A. Thea hollow tubular main body 1 having first tubular sleeve opening 2 being attached to the first casing 4 and a second tubular sleeve opening 3 being attached to a second casing 5. The drawing outlines how the connector can take up thermal expansion due to temperature change when high temperature media starts to flow through the casings and contraction when the well needs to be cooled down for maintenance. An axially extending inwardly facing circumferential spacing 21 is created by an inwardly extending upper rim 11 in proximity to the first tubular sleeve opening 2 and an inwardly extending central rim 13. An inner tubular member 7 is provided extending radially within the spacing 21. The inner tubular member has a first circumferential engaging zone for engaging a mating engaging zone of an end of said first casing 4 and a second circumferential engaging zone in proximity to the second tubular sleeve opening 3, for engaging a mating engaging zone of an end of the second casing 5. The drawing shows how the inner tubular member 7 is shorter in the axial direction than the inwardly facing circumferential spacing 21 and is therefore reversibly and slidable within the inwardly facing circumferential spacing 21 between the inwardly extending upper rim 11 and the inwardly extending central rim 13. A first seal or gasket 14 is shown in the drawing. The gasket is optional but when used it will fill the free space between the inwardly extending central rim 13 and the most distal part of the inner tubular member 7. When high temperature media starts to flow through the casings this gasket melts away and the inner tubular member 7 can slide freely in an axial direction within the spacing 21.

Figures 3A, 3B:
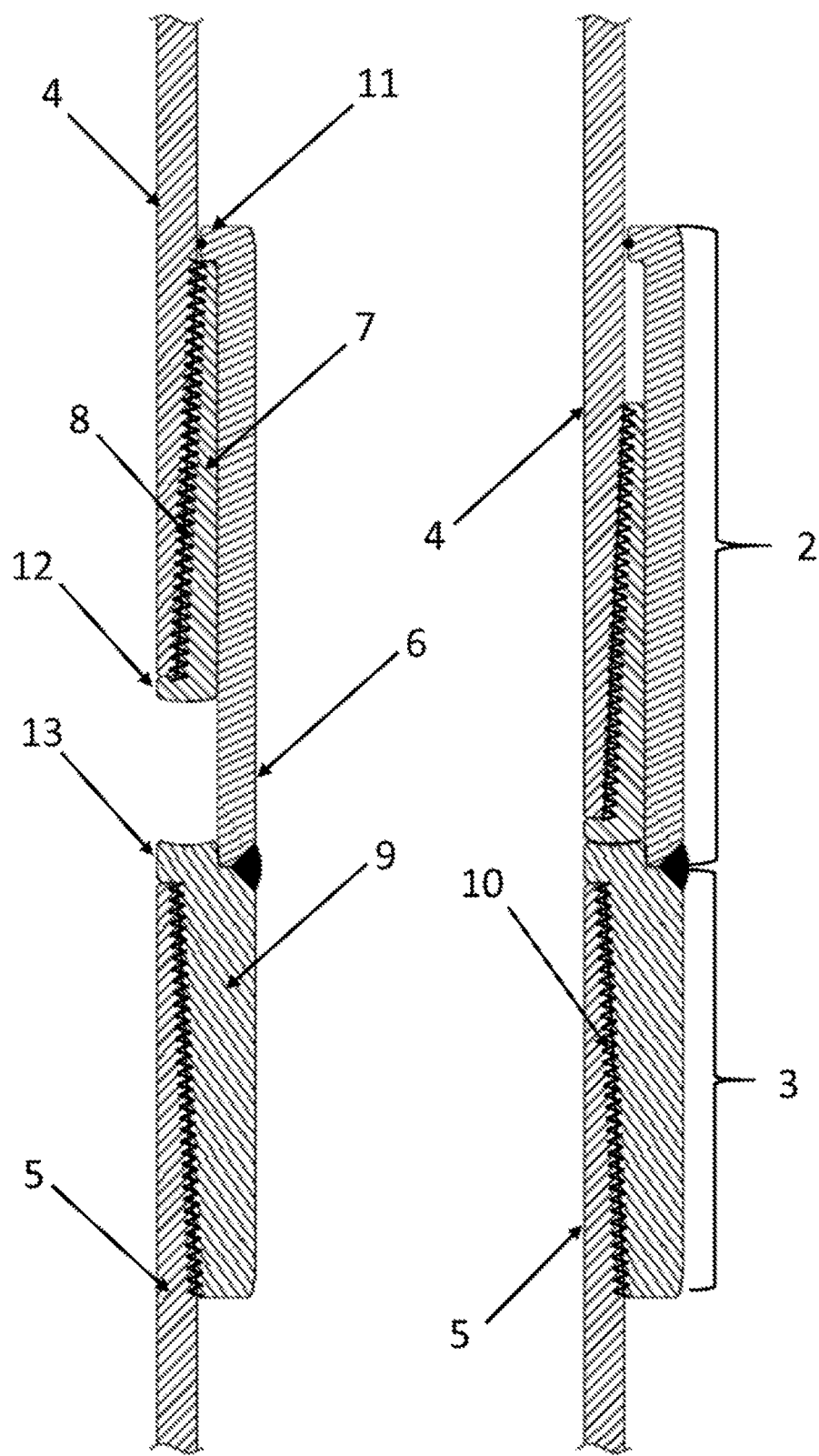
FIGS. 3A and 3B show a transection of two casings being connected by the connector of the invention in mounting position (FIG. 3A) and in connection position (FIG. 3B) outlining the individual parts of the connector.

FIGS. 3A and 3B show in transection how two casings have been connected by the connector in an (open) mounting or maintenance position (FIG. 3A) and in a (closed) connecting or operating position (FIG. 3B). There the first or upper tubular sleeve opening 2 has two different mayor components, namely an outer support member 6 and an inner tubular member 7. The inner member has circumferential attaching zone 8 for attaching the upper casing 4 end to the connector, but this is done by attaching the casing 4 into the inner tubular member 7 of the upper tubular sleeve opening 2 using circumferential attaching zone 8 of the inner tubular member 7 and a matching outer circumferential attaching zone of the upper casing 4. In embodiments where the circumferential sealing means is a screw thread, both the outer end of the casing and the inner circumference of the connecting part of the connector have matching screw threads and the casing is screwed all the way into the connector to form a tight connection to the other casing. The second or lower tubular sleeve opening 3 comprises an outer support member 9 further comprising a circumferential attaching zone 10 for attaching the second casing 5 end to the connector. The outer support member 6 of the upper tubular sleeve opening 2 has an inwardly extending upper rim 11 extending inwardly the equivalent to the thickness of the upper opening of the inner tubular member 7. Additionally, the inner tubular member 7 of the upper tubular sleeve opening 2 has an inwardly extending lower rim 12 extending inwardly the equivalent to the thickness of the lower opening of the casing 4. Furthermore, the second tubular sleeve opening 3 comprises an inwardly extending upper rim 13 extending inwardly the equivalent to the thickness of the inwardly extending lower rim 12 of the inner tubular member 7. The inner tubular member 7 of the upper tubular sleeve opening 2 is shorter than the outer support member 6 of the upper tubular sleeve opening 2 and is slidably movable between the inwardly extending upper rim 11 of the outer support member 6 and the inwardly extending upper rim 13 of the second tubular sleeve opening 3. The distance, of which the inner member is slidable within the upper tubular sleeve opening 2 is calculated as the distance which one casing expands due to the temperature increase in the environment of pumping up geothermal media or oil. If the well needs to be cooled down for maintenance, the casings are able to contract back to the length during mounting due to the allowable sliding length within the connector.

When the connector of the present invention is being used, the casing segments are connected by screwing them into the connector before or as they are lowered down into a borehole using screw thread 8 and 10 in the connector. The upper casing 4 is secured to the upper tubular sleeve opening 2 of the connector and the lower casing 5 to a lower tubular sleeve opening 3 of the connector. The zigzag lines 8 and 10 define screw threads of the upper and lower casing 4, 5 matching the screw thread of the upper and lower tubular sleeve opening 2, 3 respectively. The first seal or gasket 14 (not shown in this drawing) between the casings in a mounting position prevent water, drilling mud or concrete from flowing into the joint between the upper and lower casing during mounting and to keep a maximum distance between the pipes during mounting. As the inner tubular member 7 of the upper tubular sleeve opening 2 is shorter than the outer support member 6 and is slidably movable within the outer support member 6 when the pipes heat up and expand due to the high temperature. This means that the inner member will slide into connection position when the well heats up due to hot steam. Furthermore, in cases when the well needs to be cooled down for maintenance or the like, the inner member can slide back into mounting position without disrupting the pipeline.

In FIG. 3A the space between the lowest part of the inner tubular member 7 of upper tubular sleeve opening 2 and the upper part of the lower tubular sleeve opening 3, defines the space where the first seal/gasket during mounting and the distance of the space amounts to approximately the longitudinal thickness of the seal/gasket when the inner tubular member 7 of the upper tubular sleeve opening 2 sits in mounting position.

In FIG. 3B there is no space between the lowest part of the inner tubular member 7 of upper tubular sleeve opening 2 and the upper part of the lower tubular sleeve opening 3 as the gasket has been sacrificed and the two casings are connected in connecting position. A recess is shown in the upper part of the upper tubular sleeve opening 2 in FIG. 3B for housing a second seal/gasket in the upper rim 11 to prevent water, drill mud or cement to seep into the connector. This is an optional feature of the present invention although shown in the transactional drawings.

Figure 4A:
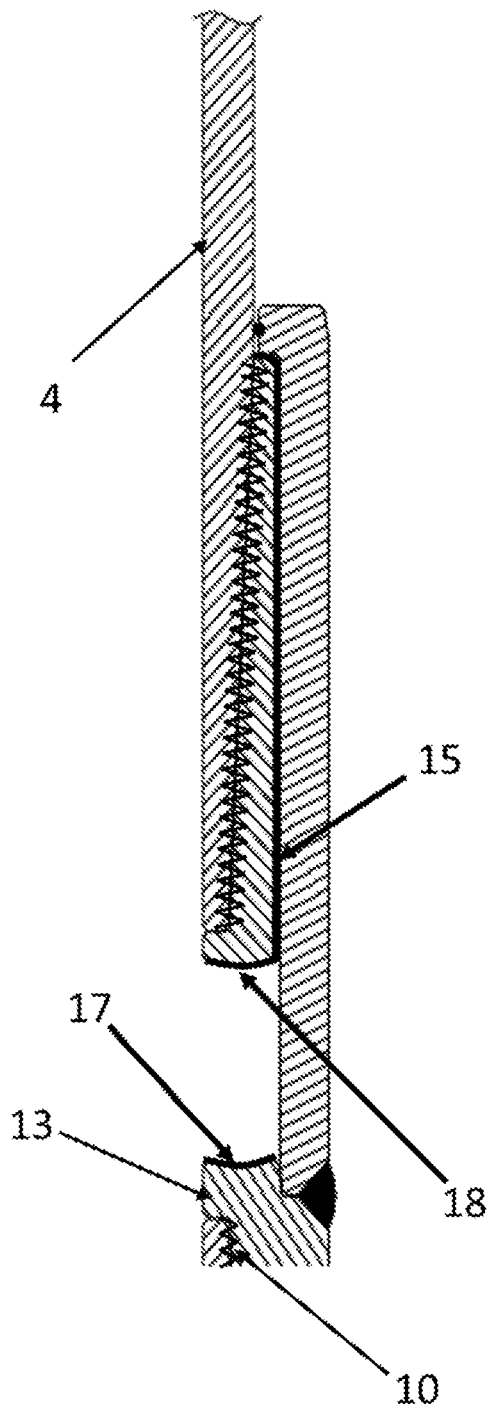
FIGS. 4A and 4B show a transection of two casings being connected by the connector of the invention in mounting position (FIG. 4A) and in connection position (FIG. 4B) outlining the surfaces forming the sealing properties of the connector.
Figure 4B:
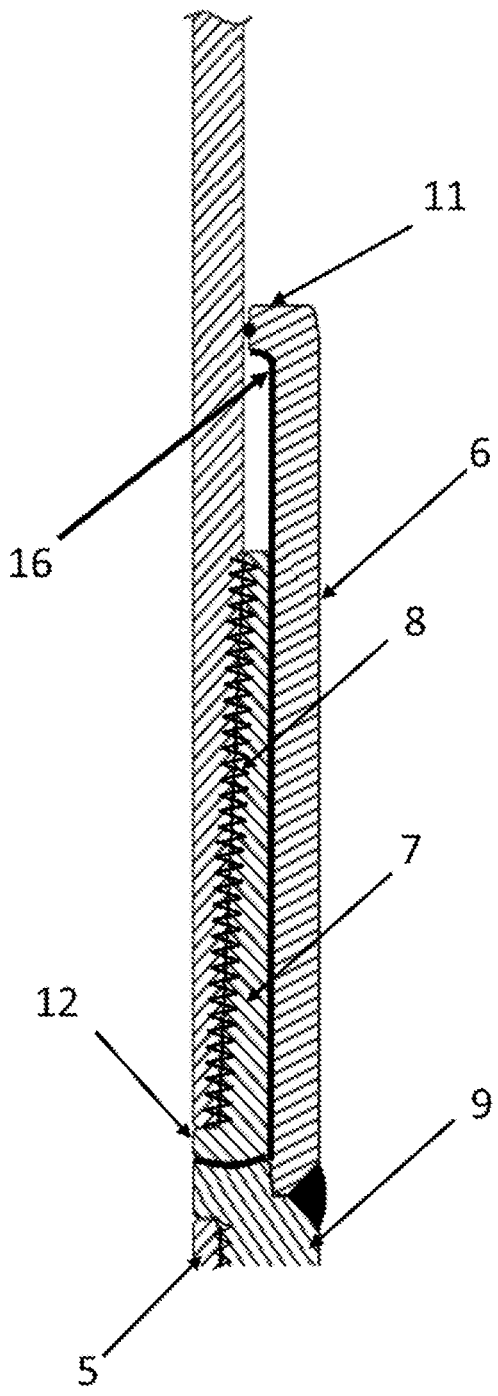

FIGS. 4A and 4B outline how the connector of the present invention forms a metallic seal by its components in both a mounting/maintenance position as well as in an operating position. In FIG. 4A the connector is in a mounting/maintenance position. The outer surface 15 (shown with a thick line in FIG. 4A) of the inner member 7 and the inner surface 16 (shown with a thick line in FIG. 4B) of outer support member 6 form a metallic seal in a mounting/maintenance position. In FIG. 4B, the connector is in an operating position. The outer surface 15 of the inner member 7 and the inner surface 16 of outer support member 6 together with the bottom surface 17 (shown with a thick line in FIG. 4A) of the inwardly extending lower rim 12 of the inner member 7 and the top surface 18 (shown with a thick line in FIG. 4A) of the inwardly extending lower rim 13 of the outer support member 9 of the second tubular sleeve opening 3 form a metallic seal in a connecting position. As can be seen in FIGS. 4 A and B, the circumferential sealing zone/means 8 extends essentially to the lowest part of the inner member 7 (to the inwardly extending lower rim 12) of upper tubular sleeve opening 2. In the same manner the circumferential sealing zone/means 10 of the lower tubular sleeve opening 3 extends essentially to the most upper part (to the rim 13) of the lower tubular sleeve opening 3.

Figure 5A:
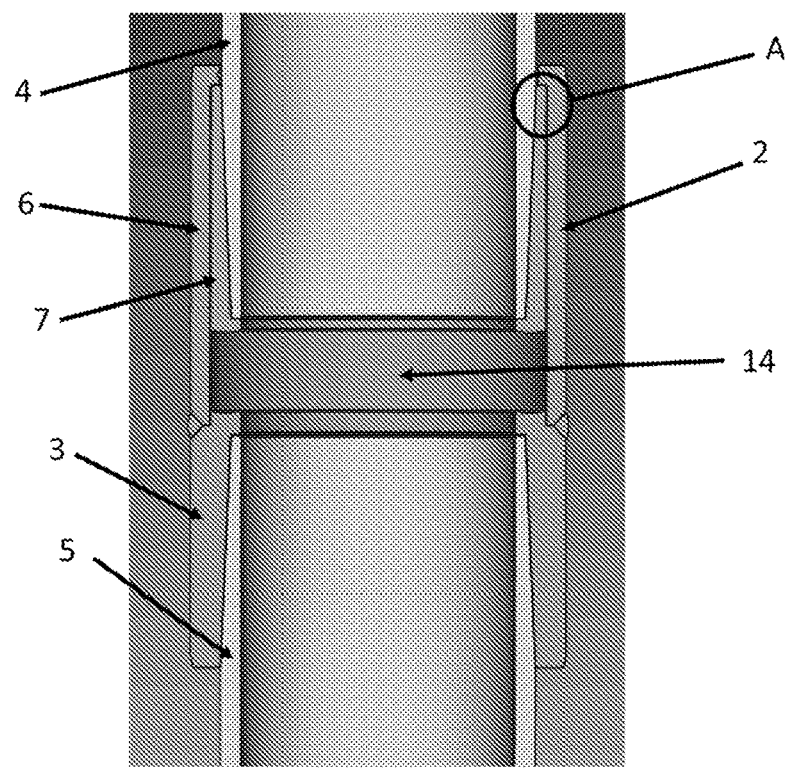
FIGS. 5A and 5B show the connector of the present invention in mounting position (FIG. 5A) and in connection position (FIG. 5B).
Figure 5B:
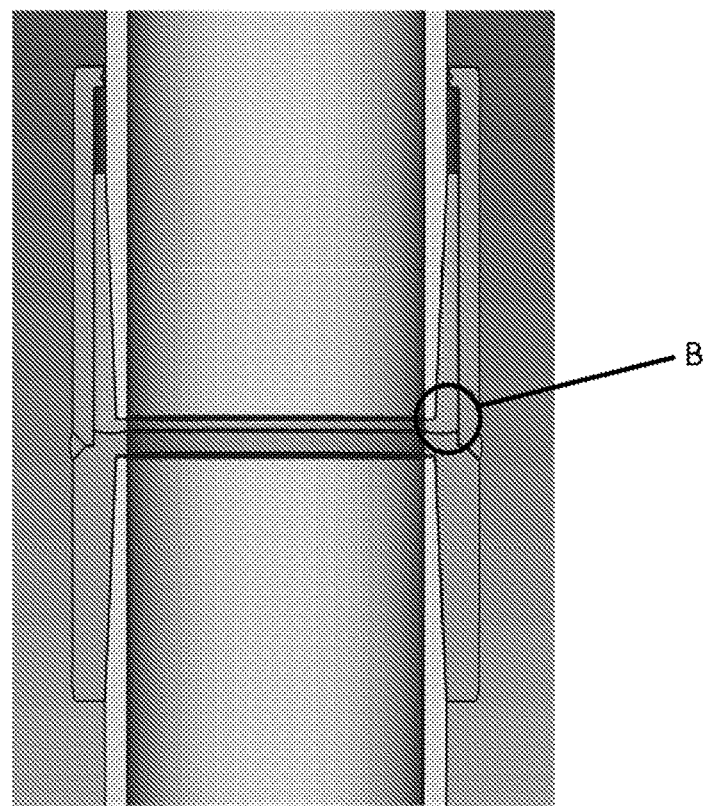
Figure 6:
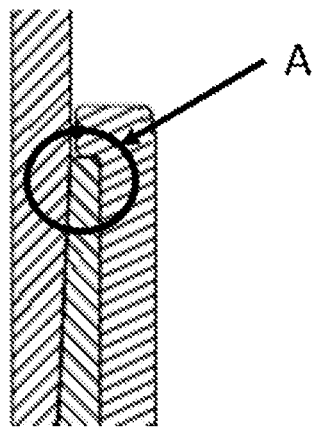
FIG. 6 shows a transection of the sliding member in mounting position.
Figure 7:
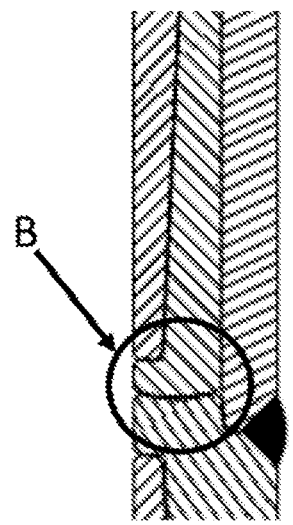
FIG. 7 shows a transection of the sliding member in connecting position.

FIG. 5 shows in a schematic drawing two casings being connected by a connector in mounting/maintenance position (FIG. 5A) and in connection/operating position (FIG. 5B). In the embodiment shown in FIG. 5A, a first sacrificial seal/gasket 14 is positioned between the upper tubular sleeve opening 2 and a lower tubular sleeve opening 3, but this gasket melts or disintegrates when hot steam and brine starts to flow up the casing. In FIG. 5A, the inner member 7 of the upper tubular sleeve opening 2 sits in mounting seat A, but in FIG. 5B it is in connecting seat B. This is also shown with transactional view in FIGS. 6 and 7.

Figure 8:
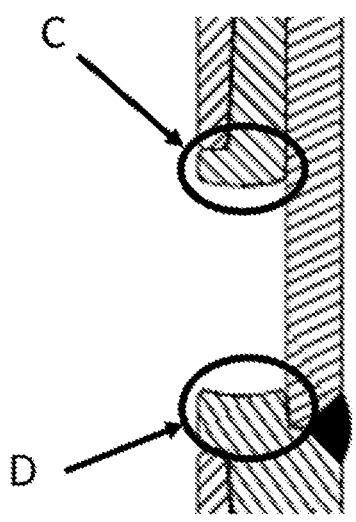
FIG. 8 shows a transection of the connecting portion C of the sliding member and the connecting portion D of the second tubular sleeve opening in mounting position.
Figure 9:
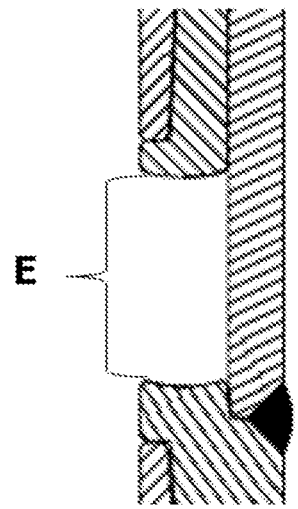
FIG. 9 shows a transection of the gap between the connecting portion of the sliding member of first tubular sleeve opening and the connecting portion of the second tubular sleeve opening.

FIG. 8 defines connection points C of the inner member 8 of first tubular sleeve opening 2 and connecting portion D of the second tubular sleeve opening 3, but the space between connecting portions C and D is similar to the longitudinal thickness of the first seal/gasket. When the well is activated and steam or brine of high temperatures enters the casing, the gasket melts away and the inner member 7 of the first tubular sleeve opening 2 slides from mounting seat A to connecting seat B where connecting portions C and D meet and form a tight connection. The space between connecting portions C and D is defined as distance E in FIG. 9.

Figure 10A:
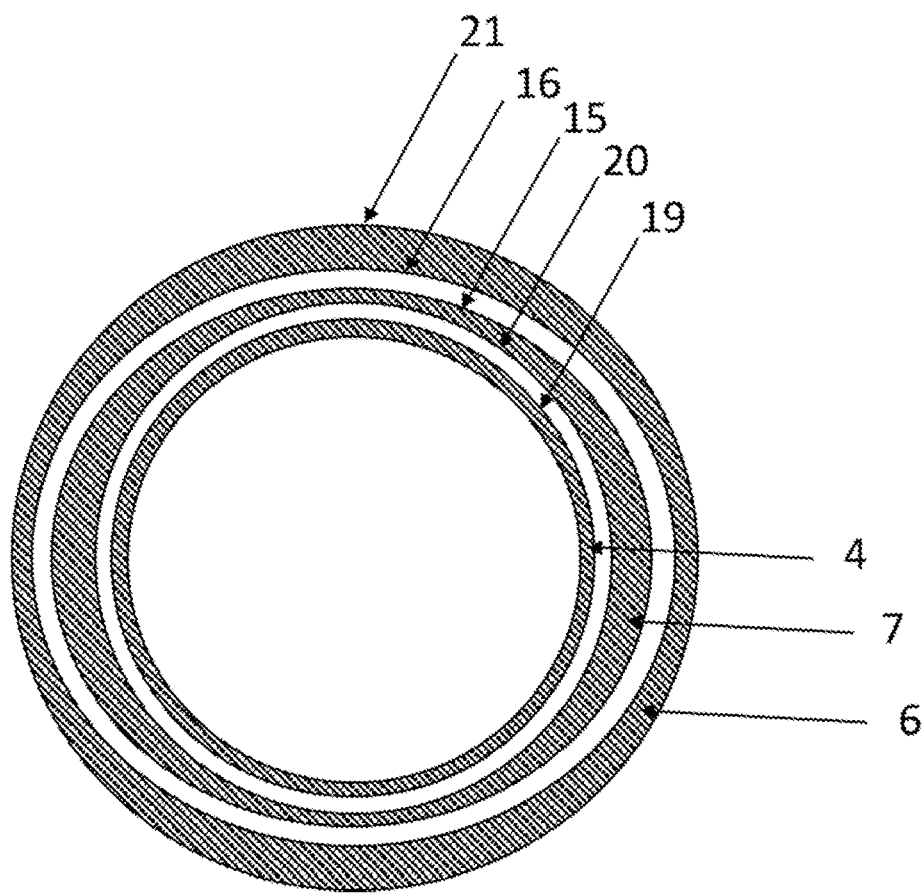
FIG. 10 shows two embodiments for providing restrictive structural formations to restrict rotation around the length of the casing.

FIG. 10A shows a cross-sectional view of a first casing 4 being secured into the connector 1. The space between the casing and the inner member as well as the space between the sliding inner member 7 and the hollow tubular main body 6 is exaggerated to outline the restrictive structural formations to restrict rotation around the length of the casing. The outer surface 19 of the casing 4 is secured to the inner surface 20 of the sliding inner member 7 by a screw thread for example. The outer surface 15 of the inner member 7 and the inner surface 16 of outer support member 6 have an elliptical shape in this embodiment to prevent rotation around the length of the casing, whereas the outer surface 19 of the casing 4 and the inner surface 20 of the sliding inner member 7 are completely circular to provide connectivity by screwing the two components together. The outer circumference of the outer support member is also shown as circular. It should be noted that only a small degree of elliptical shape is required to prevent rotation around the length of the casing, but this is exaggerated in this drawing for demonstrational purposes.

Figure 10B:
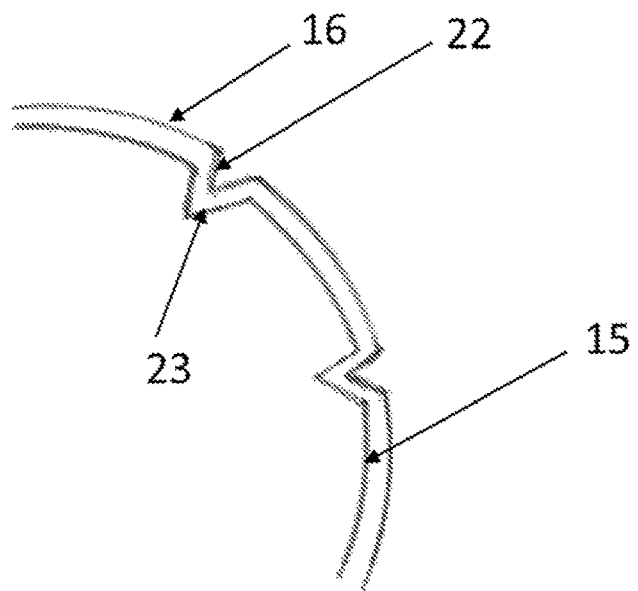

In FIG. 10B, a different type of restrictive structural formations is shown. The mating surfaces of outer surface 15 of the inner member 7 and the inner surface 16 of outer support member 6 have mating protrusions 22 in the outer support member 6 and depressions 23 in the inner member 7.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A connector for connecting casing segments used in wells drilled in high temperature areas and for transport of high temperature media, the connector comprising:
    a hollow tubular main body (1) with an outer support member (6) of a first tubular sleeve opening (2) to be attached to first casing (4) and an outer support member (9) of a second tubular sleeve opening (3) to be attached to a second casing (5),
    an inwardly facing circumferential spacing (21) axially extending between an inwardly extending upper rim (11) in proximity to the first tubular sleeve opening (2) and an inwardly extending central rim (13),
    an inner tubular member (7) extending radially within the spacing (21), said inner tubular member comprising a first circumferential engaging zone (8) for engaging a mating engaging zone of an end of said first casing (4), wherein the inner tubular member (7) comprises an abutting inwardly extending rim (12) that contacts the peripheral end surface of the first casing (4) when the first casing (4) is fully attached,
    a second circumferential engaging zone (10) in proximity to the second tubular sleeve opening (3), for engaging a mating engaging zone of an end of the second casing (5),
        wherein the inner tubular member (7) is shorter in an axial direction than the inwardly facing circumferential spacing (21) and is reversibly slidable within the inwardly facing circumferential spacing (21) between the inwardly extending upper rim (11) and the inwardly extending central rim (13), and
    wherein the connector further comprises a first sacrificial seal/gasket (14) between said inwardly extending central rim (13) and the inner tubular member (7).

2. The connector according to claim 1, wherein a longitudinal thickness of the first sacrificial seal/gasket (14) is similar to the space between a connecting portion (C) of the inner tubular member (7) and a connecting portion (D) of the central rim (13), when the inner tubular member (7) sits in mounting seat (A), in a most distal position of the inner tubular member.

3. The connector according to claim 1, wherein an outer surface of the inner tubular member (7) and an inwardly facing surface of the inwardly facing circumferential spacing (21) are essentially parallel to the axial direction.

4. The connector according to claim 1, wherein the inner tubular member (7) comprises an abutting inwardly extending rim (12) that contacts the peripheral end surface of the first casing (4) when the first casing (4) is fully attached.

5. The connector according to claim 1, wherein the high temperature media comprises one or more of oil, steam, water or brine.

6. The connector according to claim 1, wherein the first circumferential engaging zone 181 and the second circumferential engaging zone (10) comprise a screw thread.

7. The connector according to claim 6, wherein the first circumferential engaging zone (8) extends essentially to the abutting inwardly extending rim (12) of the inner tubular member (7) and wherein the second circumferential engaging zone (10) of the second tubular sleeve opening (3) extends to the inwardly extending central rim (13) of the second tubular sleeve opening (3).

8. The connector according to claim 1, wherein an outer surface (15) of the inner tubular member (7) and an inner surface (16) of the hollow tubular main body have restrictive structural formations to restrict rotation around the length of the casing.

9. The connector according to claim 1, wherein the structural formations to restrict rotation around the length of the casing comprise protrusions in one member and respective depressions in the other member or slight elliptical circumference in the mating surfaces of the two members.

10. A method for connecting casing segments used in drilling wells through in high temperature areas and transport of high temperature media through the casings using a connector, said method comprising:
    engaging a first casing (4) to a first tubular sleeve opening (2) of a connector having a hollow tubular main body (1) with an outer support member (6) and engaging a second casing (5) to an outer support member (9) of a second tubular sleeve opening (3) of the connector,
    wherein the first casing (4) is engaged to a mating circumferential engaging zone (8) in the inner tubular member (7) of the first tubular sleeve opening (2) and wherein the second casing (5) is engaged to a mating circumferential engaging zone (10) in the second tubular sleeve opening (3), wherein the inner tubular member (7) comprises an abutting inwardly extending rim (12) that contacts the peripheral end surface of the first casino (4) when the first casino (4) is fully attached,
    wherein the inner tubular member (7) is shorter in an axial direction than the inwardly facing circumferential spacing (21) and is reversibly slidable within the inwardly facing circumferential spacing (21) between the inwardly extending upper rim (11) and the inwardly extending central rim (13) to take up expansion and contraction of the casings as a result of a temperature change, and wherein the connector further comprises a first seal/gasket (14) between second tubular sleeve opening (3) and the inner tubular member (7) within the hollow tubular main body (1) to prevent water or concrete from flowing into a joint between the first and second casinos (4, 5) during mounting and to keep a maximum distance between the casinos during mounting.

11. The method according to claim 10, wherein an outer surface of the inner tubular member (7) and an inwardly facing surface of the inwardly facing circumferential spacing (21) contact to form a metallic sealing with sealing surfaces that are essentially parallel to the axial direction.

12. The method according to claim 10, wherein a longitudinal thickness of the first seal/gasket (14) is similar to a distance (E) between the connecting portion (C) of the inner tubular member (7) of first tubular sleeve opening (2) and a connecting portion (D) of the second tubular sleeve opening (3), when the inner tubular member (7) of the first tubular sleeve opening (2) sits in mounting seat (A) and wherein the first seal/gasket melts away due to heating of the casing and the connecting portion of the inner tubular member (7) of first tubular sleeve opening (2) is positioned in connecting seat (B).

13. The method according to claim 12, wherein the distance (E) between the connecting portion (C) of the inner tubular member (7) of first tubular sleeve opening (2) and the connecting portion (D) of the second tubular sleeve opening (3) accounts for the entire increase or decrease in length of the casings due to expansion or contraction as a result of temperature change.

14. The method according to claim 10, wherein the casings are attached to the connector by screwing the upper casing into a screw thread of the inner surface of the inner tubular member (7) and screwing the lower casing into a screw thread of the outer support member (9) before they are lowered down into a borehole using screw thread (8) and (10) in the connector.

15. The method according to claim 10, wherein an outer surface (15) of the inner tubular member (7) and an inner surface (16) of the outer support member (6) form a metallic seal in an open mounting position.

16. The method according to claim 10, wherein the outer surface (15) of the inner tubular member (7) and the inner surface (16) of outer support member (6) together with the bottom surface (17) of the inwardly extending lower rim (12) of the inner tubular member (7) and the top surface (18) of the inwardly extending lower rim (13) of the outer support member (9) of the second tubular sleeve opening (3) form a metallic seal in a connecting position.

* * * * *

UNITED STATES PATENT AND TRADEMARK OFFICE
CERTIFICATE OF CORRECTION

PATENT NO. : 11,041,343 B2  
APPLICATION NO. : 16/063355  
DATED : June 22, 2021  
INVENTOR(S) : þorbjörnsson Page 1 of 1

It is certified that error appears in the above-identified patent and that said Letters Patent is hereby corrected as shown below:

In the Claims

Column 12 & 13:

Claim 10 Line 60: Delete "casino" Insert --casing--

Claim 10 Line 61: Delete "casino" Insert --casing--

Claim 10 Line 8: Delete "casinos" Insert --casings--

Claim 10 Line 9: Delete "casinos" Insert --casings--

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*